Jan. 17, 1961 J. LEON 2,968,757
SINGLE PHASE TO THREE PHASE CONVERTER
Filed Feb. 20, 1959

JOHN LEON
INVENTOR

BY Ralph E. Bitner
ATTORNEY

United States Patent Office 2,968,757
Patented Jan. 17, 1961

2,968,757

SINGLE PHASE TO THREE PHASE CONVERTER

John Leon, Trumbull, Conn., assignor, by mesne assignments, to Sorensen & Company, Incorporated, South Norwalk, Conn., a corporation of Delaware Filed Feb. 20, 1959, Ser. No. 794,616

8 Claims. (Cl. 321—58)

This invention relates to a phase converter which transforms single phase alternating current power into multiple phase power of any number of phases. The invention has particular reference to a circuit means for converting single phase to multiple phase power even though the frequency may vary over a wide range.

There have been a number of phase conversion networks devised and used which transform alternating current power from a single phase system into a multiple phase system. Some of these systems utilize rotating machinery and while the results of these systems are accurate and useful they suffer the disadvantages which always accompany the use of rotating masses and in addition cannot be adjusted in their phase relationship. Other phase conversion systems use circuits which include inductors and capacitors as the primary means for shifting the phase angle of a portion of a single phase system to obtain voltages which are necessary in the polyphase arrangement. All such systems maintain their adjustment for one frequency only and as soon as the frequency is changed the system is thrown out of balance. The present system does not use rotating parts; it does not use inductive reactors for phase adjustment; it maintains its adjustment over a frequency range which may vary within a range of 6.7 to 1 in frequency values; and each of the resulting phase voltages is manually adjustable.

One of the objects of this invention is to provide an improved phase converter which avoids one or more of the disadvantages and limitations of prior art arrangements.

Another object of the invention is to change single phase alternating current to three phase alternating current power.

Another object of the invention is to provide a single phase to three phase converter system which is insensitive to frequency changes over a wide range.

Another object of the invention is to provide a phase conversion system which can change single phase alternating current power to any number of phases such as two, three, four, five, or six.

Another object of the invention is to provide a phase changing system having a manual control which may be used to alter the phase relationship of the output voltage with respect to the single phase input power.

Another object of the invention is to provide a phase converter whose individual output phases may be adjusted over a wide range of phase angle values in reference to other output phases.

The invention includes a phase dividing circuit coupled through a transformer which produces two phase alternating current. This conversion is made by means of two networks, each containing capacitors and resistors. The two phase voltages are applied through cathode follower circuits to a closed loop resistor so that currents within the resistor rotate in a cyclic manner. Voltages for another multiphase system are obtained by connecting voltage leads to points on the resistance and power amplifiers are used to transfer these voltages into alternating current power.

For a better understanding of the present invention, together with other and further objects thereof, reference is made to the following description taken in connection with the accompanying drawings.

Figure 1:
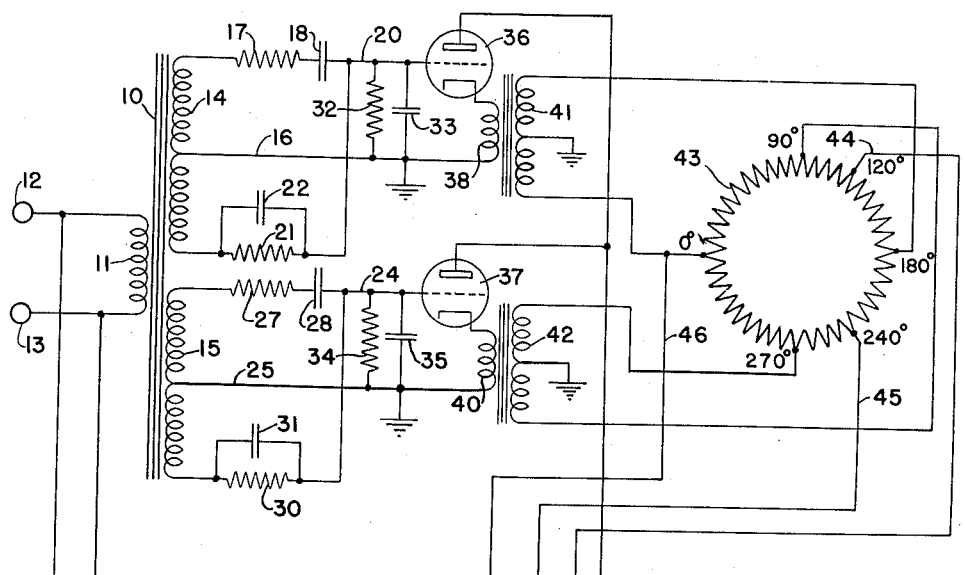
Fig. 1 is a schematic diagram of connections showing the phase converter with the amplifiers indicated in block form.

Referring now to the drawings, Fig. 1 shows the diagram of connections which includes an input transformer 10 having a primary winding 11 connected to input terminals 12 and 13 which are to be connected to a source of single phase power. Transformer 10 has two secondaries 14 and 15, each having a center tap. Each of the transformer secondaries are connected to similar circuits but the values of the circuit components in each of the circuits are generally different. The mid-tap of winding 14 is connected to a conductor 16 which is one of the pair of conductors which produce one phase. The upper end of winding 14 is connected to conductor 20 in series with a resistor 17 and a capacitor 18. Conductor 20 is the second of the pair of conductors which produces the first phase. The lower end of winding 14 is connected to conductor 20 in series with a resistor 21 connected in parallel with a capacitor 22.

Winding 15 is connected in a manner similar to winding 14, having two output conductors 24 and 25. The upper end of winding 15 is connected to conductor 24 in series with resistor 27 and capacitor 28 while the lower end of winding 15 is also connected to conductor 24 in series with resistor 30 and capacitor 31 connected in parallel with each other. Conductor 25 is connected to the center tap of winding 15.

Each of the shifting networks is shunted by a resistor-capacitor connection. Conductors 20 and 16 are connected by a resistor 32 and capacitor 33 while conductors 24 and 25 are connected by a resistor 34 and a capacitor 35. With the correct values assigned to each of the circuit components, the two pairs of conductors 16—20 and 24—25 produce alternating current voltages which remain in quadrature over a wide range of applied input frequencies.

In order to isolate the phase changing networks from a load, two vacuum tube triodes 36 and 37 are connected to the network outputs as cathode follower amplifiers. Conductors 20 and 24 are connected to the control electrodes and conductors 16 and 25 are connected to the lower end of primary windings 38 and 40, the upper ends of which are connected to the cathodes of the two triodes. Secondary windings 41 and 42, coupled to primary windings 38 and 40 are grounded at their mid-points with their ends connected to a closed loop resistor 43. The ends of winding 41 are connected to opposite points on the loop (designated 0° and 180°) while the ends of winding 42 are also connected to opposite points on the loop (designated 90° and 270°) in quadrature relationship. Since the alternating voltages are ninety degrees of phase apart, a revolving current is produced in the resistor loop and any number of phases may be created by connecting to appropriate points around the resistor loop. By grounding the mid-points of windings 41 and 42 a virtual ground is established at the center of the loop.

The circuit shown in Fig. 1 is arranged to produce three phase power and to obtain this result three conductors 44, 45, and 46, are connected to points on the closed loop resistor 43 which differ from each other by 120 degrees. By connecting three conductors to three points 120 degrees apart, three phase voltages are produced which may be applied to power amplifiers 47, 48, and 49, and produce a three phase output at terminals 50, 51, and 52, connected to the output circuits of these amplifiers.

Anode and filament power for triodes 36 and 37 and for the three power amplifiers is supplied by a conventional power supply 53 which receives alternating current power from input terminals 12, 13. One side of the power supply is grounded and one of the input terminals for each amplifier 47, 48, and 49, is also grounded.

It is contemplated to make each amplifier 47, 48, and 49, a voltage regulator so that variations of load connected to the output terminals will not influence the output voltage. The addition of a regulator circuit, however, is a matter of choice and may be omitted.

The closed loop resistor 43 may be made of bare resistance wire and wound on a toroidal insulator. The four conductors from windings 41 and 42 may be permanently connected at one side of the coil and the contact points for the three phase output may be manually adjustable so that either one may be moved independently of the other or all three may be moved together without disturbing their individual relationship with each other. It will be obvious that this latter adjustment provides a flexibility which is not found in other phase conversion networks.

Figure 2:
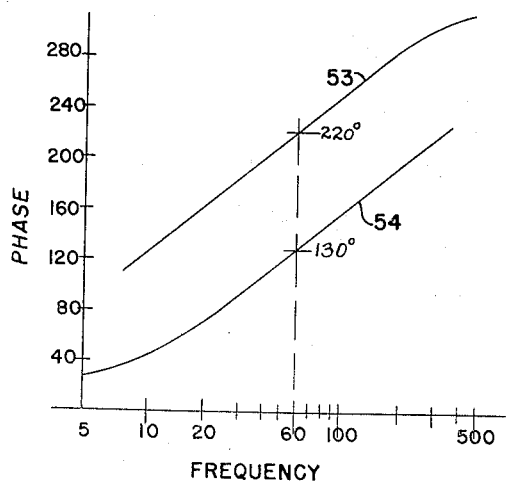
Fig. 2 is a graph showing the relationship between the phase angles produced by the divider network and the input frequency.

The graph in Fig. 2 shows the relationship between the voltages produced by the two networks, line 53 indicating the phase angle of the voltage between conductors 16 and 20 while line 54 indicates the phase of the voltage between conductors 24 and 25. It will be noted that while the phase of each pair of conductors changes in a linear manner with a change of frequency the phase difference between the two remains constant at 90 degrees.

In order to produce the quadrature phase difference, different values must be assigned to similar capacitors in the two networks. The following are a set of values which produces the desired result.

| | | |
|---|---|---|
| Resistors 17 and 27 | ohms | 1,000 |
| Resistors 21 and 30 | do | 562,000 |
| Resistors 32 and 34 | do | 229,000 |
| Capacitor 18 | micromicrofarads | 26,700 |
| Capacitor 22 | do | 4,740 |
| Capacitor 28 | do | 6,843 |
| Capacitor 31 | do | 1,200 |
| Capacitor 33 | do | 11,600 |
| Capacitor 35 | do | 2,950 |

Using the above values, the network produced two phase voltages in quadrature at all frequencies from 20 to 200 cycles per second.

The foregoing disclosure and drawings are merely illustrative of the principles of this invention and are not to be interpreted in a limiting sense. The only limitations are to be determined from the scope of the appended claims.

I claim:

1. A phase converter circuit comprising, a coupling means connected to a single phase source of electric power having a first and second pair of output terminals, said first pair of terminals connected to a first phase shifting network, said second pair of terminals connected to a second phase shifting network which produces an alternating current voltage in quadrature with the voltage of the first network; said quadrature voltage having a phase angle which is independent of the applied frequency over a wide range of values; a closed loop impedance having a first pair of diametrically opposite points coupled to the first of said networks and a second pair of diametrically opposite points coupled to the second of said networks, said first and second pairs of points arranged in quadrature relationship for producing a rotating voltage in said loop; a plurality of conductors connected to selected points on said loop impedance for producing polyphase voltages therebetween; and amplifier means connected to said conductors for producing polyphase alternating current power.

2. A phase converter circuit as set forth in claim 1 wherein said coupling means connected to a single phase source comprises a transformer having a single primary winding and two secondary windings.

3. A phase converter circuit comprising, a coupling means connected to a single phase source of electric power having a first and second pair of output terminals, said first pair of terminals connected to a first phase shifting network, said second pair of terminals connected to a second phase shifting network which produces an alternating current voltage in quadrature with the voltage of the first network, said quadrature voltage maintaining its phase angle over a wide range of applied frequency values, a closed loop resistor having a first pair of diametrically opposite points coupled to the first of said networks and a second pair of diametrically opposite points coupled to the second of said networks, said first and second pairs of points on said loop resistor for producing a rotating voltage in said loop; three conductors connected to points on said loop resistor 120 degrees apart for producing three phase voltages therebetween; and amplifier means connected to said conductors for producing three phase alternating current power.

4. A phase converter circuit as set forth in claim 3 wherein each of said phase shifting networks comprises a series connected resistor and capacitor in series with one of said pair of output terminals, a parallel connected resistor and capacitor in series with the other of said pair of output terminals, and a third conductor connected to a mid-point in said coupling means.

5. A phase converter as set forth in claim 3 wherein said three conductors connected to points on the loop are manually movable for phase adjustment.

6. A phase converter circuit comprising, a primary winding of a transformer connected to a source of single phase power, said transformer having two secondary windings, each of which is connected to a phase shifting network; said networks arranged to produce two phase alternating current voltage at their terminals, the phase of which varies with input frequency but retains its quadrature relationship over a wide range of input frequencies; a closed loop resistor having a first pair of diametrically opposite points coupled to one of said phase shifting networks and a second pair of diametrically opposite points coupled to the other of said phase shifting networks; said first and second pairs of points producing a rotating voltage in said loop; three conductors connected to points on said loop resistor 120 degrees apart for producing three phase voltages therebetween; and amplifier means connected to said conductors for producing three phase alternating current power.

7. A phase converter circuit as set forth in claim 6 wherein said phase shifting networks are connected to said closed loop resistor by means of vacuum tube amplifier circuits.

8. A phase converter circuit as set forth in claim 7 wherein said amplifier circuits each include an output transformer, the secondary of which is grounded at its midpoint.

References Cited in the file of this patent

UNITED STATES PATENTS

| | | |
|---|---|---|
| 1,394,325 | Meyer | Oct. 18, 1921 |
| 2,731,590 | Smith | Jan. 17, 1956 |

FOREIGN PATENTS

| | | |
|---|---|---|
| 632,007 | Great Britain | Nov. 15, 1949 |